United States Patent [19]

Henoch et al.

[11] 4,333,078

[45] Jun. 1, 1982

[54] APPARATUS FOR SYNCHRONIZED RECEPTION IN CONNECTION WITH SYSTEM FOR RECORDING OBJECTS

[75] Inventors: Bengt Henoch, Hagersten; Eilert Berglind, Bandhagen, both of Sweden

[73] Assignee: Stiftelsen Institutet for Mikrovagsteknik vid Tekniska Hogskolan i Stockholm, Stockholm, Sweden

[21] Appl. No.: 268,496

[22] Filed: May 29, 1981

Related U.S. Application Data

[63] Continuation-in-part of Ser. No. 67,139, Aug. 16, 1979, abandoned.

[30] Foreign Application Priority Data

Aug. 25, 1978 [SE] Sweden ............................. 7809018

[51] Int. Cl.³ ....................... G01S 13/76; G01S 13/80; G01S 13/82
[52] U.S. Cl. .................... 343/6.5 LC; 343/6.8 LC; 343/6.5 SS
[58] Field of Search ................. 343/6.5 LC, 6.5 SS, 343/6.8 LC

[56] References Cited

U.S. PATENT DOCUMENTS

| | | | |
|---|---|---|---|
| 3,018,475 | 1/1962 | Kleist et al. | 343/6.5 SS X |
| 3,022,492 | 2/1962 | Kleist et al. | 343/6.5 SS |
| 3,521,280 | 7/1970 | Janco et al. | 343/6.5 SS |
| 3,611,379 | 10/1971 | Deckett | 343/6.5 LC X |
| 3,772,688 | 11/1973 | Smit et al. | 343/6.5 LC |
| 3,801,980 | 4/1974 | Danton et al. | 343/6.5 LC |
| 4,196,434 | 4/1980 | Fanatsu et al. | 343/6.5 R X |
| 4,297,700 | 10/1981 | Nard et al. | 343/6.5 R |

Primary Examiner—Malcolm F. Hubler
Attorney, Agent, or Firm—LeBlanc, Nolan, Shur & Nies

[57] ABSTRACT

An apparatus for synchronized signal reception wherein a first signal of frequency $f_o$ is transmitted by a first unit and is reflected by a second unit, which thus transmits the reflected second signal. The reflected signal is modulated by information which is supplied by a coding device 27 in said second unit, which coding device generates a coded pulse train 27p in the form consisting of pulses, i.e. information symbols. A pulse generator 28 is controlled by the pulse train to emit a signal with one of two frequencies $k_1$ and $k_2$, respectively, in dependence upon the binary state of the pulse train. The signal is divided in a frequency divider 29 to provide frequencies $k_1/n$ and $k_2/n$, respectively, which are supplied to the coding device 27, causing the coding device to emit said pulses with lengths which are related to the cycle lengths of frequencies $k_1/n$ and $k_2/n$, respectively. The signal generated in the pulse generator 28 with the frequencies $k_1$ and $k_2$, is applied as a modulating signal to the modulator 26, which generates a single sideband with the alternating frequencies $f_o+k_1$ and $f_o+k_2$, respectively, constituting said second signal. The receiver 23 of the first unit receives the reflected second signal and scans said information symbols by means of the duration of the signal in dependence of the frequency of the signal.

6 Claims, 11 Drawing Figures

APPARATUS FOR SYNCHRONIZED RECEPTION IN CONNECTION WITH SYSTEM FOR RECORDING OBJECTS

RELATED APPLICATION

This application is a continuation-in-part of our copending application Ser. No. 67,139, filed Aug. 16, 1979, now abandoned, for Apparatus For Synchronized Reception In Connection With System For Recording Objects.

FIELD OF INVENTION

This invention relates to a communication apparatus for the recording of objects and is particularly concerned with improvements in recording and identification systems of the type disclosed in our U.S. Pat. No. 4,242,661 issued on Dec. 30, 1980 for Device For Registration of Objects.

BACKGROUND AND SUMMARY OF INVENTION

In the apparatus disclosed in the above U.S. patent, a first signal is transmitted from the recording unit and is received in the recording transmitter where it is frequency converted to a second signal by a code which is individual to the recording transmitter. Thereafter, the recording transmitter retransmits the coded second signal, which is received by the recording unit, and the information content of the signal is processed and utilized. As disclosed in the above U.S. patent, the aforesaid frequency converter comprises a modulator which modulates the first signal with the code in such a way that a sideband is formed, preferably by starting and stopping the modulator according to a pattern constituting said code.

According to the present invention, the information symbols in the emitted, information-containing signal are such that the lengths of the information symbols are advantageously related to pre-selected frequencies.

The present invention achieves this object in a unique, simple way. The invention also provides an apparatus for extremely reliable transfer of information symbols between the recording transmitter and recording unit.

According to the present invention, the recording transmitter is capable of transmitting a single sideband where the information symbols are related to the frequency of the sideband, where each information symbol is transmitted by means of a single sideband and where the length of each information symbol is detected in the recording unit for evaluating the information symbol. In addition to affording a reliable and accurate transfer of information, these features of the present invention enable the information to be transferred at a faster rate as compared with the aforesaid known apparatus, because a certain information symbol can be followed immediately by a number of the same information symbols, without giving rise to difficulties in evaluating the number of consecutive information symbols of equal value.

In the illustrated embodiment, the invention is applied to a traffic control system. The mobile units in the system are each provided with a recording unit, and the stationary places are each provided with a recording transmitter. The invention, however, can be applied also in reverse order, in which case recording transmitters will be attached to mobile objects and the recording units will be located in certain selected stationary places. As examples of such an embodiment there can be mentioned the recording and sorting of railway cars and load containers, as well as the recording of motor cars.

The invention is described below, with reference to the below-described drawings.

DETAILED DESCRIPTION

The disclosure of the above-identified U.S. Pat. No. 4,242,661 is incorporated herein by reference.

Figure 1:
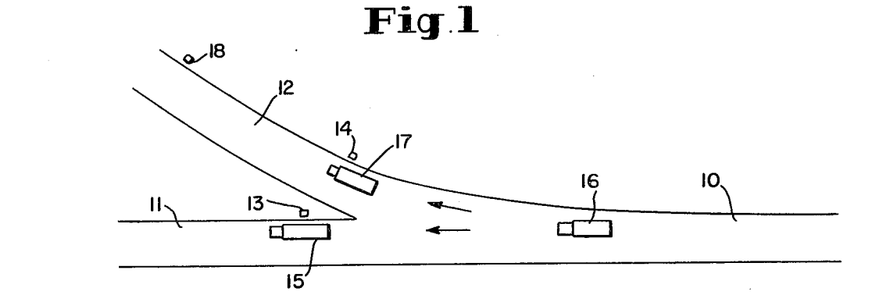
FIG. 1 shows a road section.

In FIG. 1 a road section is shown, which is used for describing one application of this invention. This road section comprises a main road 10 which branches into two separate roads 11, 12. At the starting point of the roads 11 and 12, a recording transmitter 13, 14 is positioned for each road and is intended to co-operate with recording units which are provided on motor cars, three of which are designated by 15, 16, 17. Recording transmitters 13 and 14, as disclosed in the above-identified patent, are each designed with a code characteristic of the unit in question, which code when a motor car passes a recording transmitter, is detected by the recording unit of the motor car and recorded to be utilized later on in statistics, invoicing or the like. By taking up the code for both the recording transmitter 14 and an additional transmitter 18, the speed of the motor car can be evaluated. After the recording unit of the motor car has received said code, information can be evaluated and be either stored in the car or transmitted by radio from the car to a central station. The signal transmitted from the car to the central station may contain a code characteristic of the car. The central station may carry out desired evaluations and, on the basis of information received, be used, for example, for the control of traffic lights, for giving instructions to the car with respect to road choices, etc.

Figure 2:
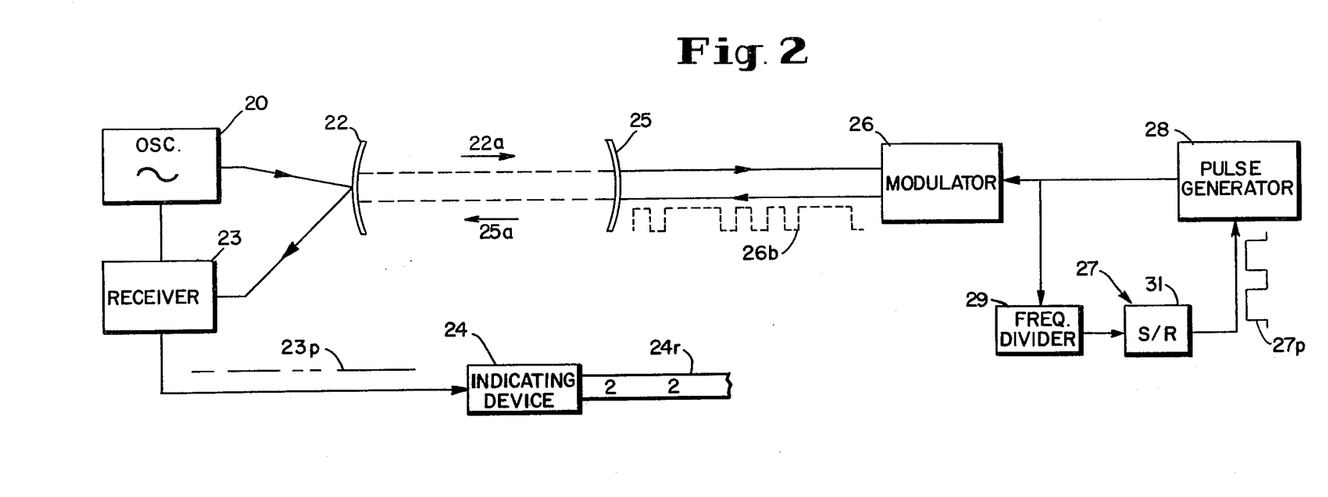
FIG. 2 is a block diagram of an apparatus according to the invention.

Referring to FIG. 2, the apparatus incorporating the principles of this invention comprises a recording unit 20–24 and a recording transmitter 25–29. The recording unit comprises a transmitter having an oscillator 20, which is capable of transmitting a high-frequency electric or electromagnetic signal with a fixed frequency of e.g. 10 GHz designated by $f_o$. The signal 22a is transmitted by an aerial 22 associated with the recording unit. The aerial 22 is also capable of receiving a recording signal 25a, which depends on said first signal. The recording unit further comprises a receiver 23 for receiving the recording signal, the receiver being selectively tuned for the frequencies of the recording signal. These frequencies are different from the frequency of the transmitted signal. The recording unit further comprises a decoder 68 (FIG. 10) for decoding and an indication device 24 for indicating or reading out a code included in the recording signal.

The recording transmitter comprises an aerial 25 for receiving the signal transmitted from the recording unit and for transmitting the recording signal, a frequency modulation circuit 26 for transmitting the recording signal, a code transmitter or encoding device 27 for transmitting a pulse train characteristic of the recording transmitter in question, which pulse train is utilized for modulating the recording signal, and a clock pulse generator 28, which is capable of generating two frequencies designated $k_1$ and $k_2$, respectively. According to a preferred embodiment, a frequency divider 29 is also provided.

The high-frequency signal 22a which is transmitted from the aerial 22 is received by aerial 25 of the recording transmitter and is passed on to the frequency modulator 26, which is of such a nature, that it frequency-modulates said signal with a coded signal so that a single sideband is formed, which has the side frequency $f_o+k_2$ or $f_o+k_1$ and, respectively, $f_o-k_1$ or $f_o-k_2$. The pulse generator 28 is designed so that at any given time moment only one of the frequencies $k_1$ and $k_2$ exists. Said sideband mostly is surrounded by a number of more or less suppressed sidebands or side frequencies, which may be disregarded. The sideband thus generated is retransmitted from the aerial 25 as recording signal 25a. Due to the fact that the recording signal 25a has a frequency different from that of the signal received, it is possible to effectively separate the recording signal from irrelevant reflections from the ambient. The binary pulse train 27p emitted by the code transmitter 27 includes pulses of different lengths or durations in respect of time. The pulse train includes said code which is stored in and supplied by device 27. The stored code may, by way of example, be one that is characteristic of the recording unit. The pulse train 27p, for example, may have the appearance shown in FIG. 2. Pulse train 27p is fed to generator 28, which supplies the modulating signal to the frequency modulator 26 in the manner described below. The generator 28 is capable of being actuated by every pulse in pulse train 27p and continues to emit a first frequency thereof as long as a pulse corresponding to one binary signal prevails and to emit its second frequency as long as a pulse corresponding to the second binary signal prevails. The generator 28 will send a signal to the frequency modulator 26 with the frequencies $k_1$ and $k_2$, respectively, for example.

Modulator 26 may be of any suitable design for producing the previously described side frequencies $f_o+k_1$ and $f_o+k_2$. For example, it may be a phase or frequency modulator of the dual-diode reflective type described and identified in the previously identified U.S. Pat. No. 4,242,661. Alternatively, it may be of the single diode type shown in FIG. 3. This latter type of modulator is described in greater detail later on and is also disclosed in our copending application Ser. No. 67,124 filed on Aug. 16. 1979.

When the interrogating signal 22a is transmitted by the recording unit's transmitter 20 and received at antenna 25, it will be fed to modulator 26 where it is reflected back to antenna 25 by the phase or frequency modulating diode arrangement. The phase of the signal reflected back to antenna 25 by modulator 26 will be rotated at an essentially constant rate by the modulating coded signal which is supplied to the modulating diode arrangement from generator 28, thus causing a change in the frequency in the signal reflected from modulator 26. The frequency of the reflected signal will depend upon the frequency of the coded signal supplied by generator 28 and is considered to be a side frequency or sideband of signal 22a. If the frequency of the received interrogating signal 22a is $f_o$, then the frequency of the reflected signal will be a first side frequency $f_o+k_1$ when the frequency of the pulse generator signal is $k_1$ and a second side frequency $f_o+k_2$ when the frequency of the pulse generator signal is $k_2$.

Thus, the signal reflected from the modulator 26, for example, will have the appearance shown at 26b in FIG. 2. It consists of two frequencies, for example, $f_o+k_1$ and $f_o+k_2$, respectively, which alternate with each other. The frequency $f_o$ is the one generated by the transmitter 20 and transmitted by the aerial 22. The higher frequency $f_o+k_1$ is the frequency of the single sideband when pulse generator 28 generates the frequency $k_1$, and the lower frequency $f_o+k_2$ is the frequency of the single sideband when pulse generator 28 generates the frequency $k_2$. These frequencies prevail during the duration of every pulse. The signal 26b has the same code pattern as the pulse train 27p and, thus, contains the same code.

The signal 26b is emitted by the aerial 25 by reception at aerial 22.

The receiver 23 in the recording unit is capable in a known manner of receiving said single sideband and of decoding said code in the decoder 68.

As an example, the frequency $f_o$ can be 1–10 GHz, while $k_1$ and $k_2$ are of the magnitude 10–100 kHz.

According to the present invention, frequency divider 29 is connected to the output of generator 28 to receive the modulating signal ($k_1$, $k_2$). Divider 29 divides the $k_1$ and $k_2$ frequencies to the frequency $k_1/n$ and $k_2/n$, respectively, which are fed into the coding device 27. The divisor n is preferably an integer. In this embodiment, coding device 27 emits the binary digits in the pulse train 27p with a length proportional to the cycle length of the frequencies $k_1/n$ and $k_2/n$, respectively. When the pulse train 27p, for example, contains a binary "0", pulse generator 28 emits, for example, the frequency $k_1$. Thus, the binary "0" will be generated by n short pulses, which are at frequency $k_1$. A binary "1" will also be generated by n short pulses, but at frequency $k_2$. According to this embodiment, each binary digit has a length, which is a multiple of the cycle length of the frequency $k_1$ and, respectively, $k_2$. Each of the binary digits thus has a specific length, which is related to the cycle length of the signal $k_1/n$ and, respectively, $k_2/n$, which are utilized in the receiver in the recording unit. This receiver 23 is capable of interpreting a binary digit from the time, during which one of the frequencies $f_o+k_1$ and, respectively, $f_o+k_2$ has been emitted by the recording transmitter.

Frequency divider 29 may be of any suitable conventional circuit design for dividing down the output of pulse generator 28. For example, a Harris Semiconductor HD 4040A frequency divider may be used. The encoding device 27 also may be of any suitable circuit design for storing and reading out the binary code. For example, encoding device 27 may be a conventional circulating shift register (indicated at 31 in FIG. 2) such as the National Semiconductor CD 4031BM/CD 4031 BC register. Pulse generator 28 also may be of any suitable, conventional design which produces an output pulse signal at frequency $k_1$ in response to a first d.c. voltage level representing a low or binary 0 and which further produces an output pulse signal at the second frequency $k_2$ in response to a second d.c. voltage level representing a high or binary 1. For example, pulse generator 28 may be a Fairchild C-mos circuit 4046.

From the foregoing description it is evident that the output of frequency divider 29 is fed to the clock input of shift register 31. Shift register 31 will therefore be clocked at the frequency $k_1/n$ when the output frequency of generator 28 is $k_1$ and at $k_2/n$ when the output frequency of generator 28 is $k_2$. Thus, the duration or length of a binary 1 digit in signal 27p will be different from the duration or length of a binary 0 digit in signal 27p. More specifically, the binary 0 bits clocked out of register 31 and forming a part of signal 27p will each have a common length or duration which is proportional to the time period $1/k_1$, and the binary 1 bits clocked out of register 31 will also be of common length or duration, but will be proportional to the time period $1/k_2$. Thus, the purpose of frequency divider 29 is to provide each binary 1 bit (a high) in signal 27p with a common duration which is equal to a multiple n of the cycle time for frequency $k_2$ and further to provide each binary 0 bit in signal 27p with a duration which is equal to the multiple n of the cycle time for frequency $k_1$.

Since pulse generator 28 continuously produces the output pulse signal frequency $k_1$ as long as a low (a binary 0) is present at its input and further continuously produces the output pulse signal frequency $k_2$ as long as a high (a binary 1) is present at its input, then there will be n number of cycles at frequency $k_1$ for each binary 0 bit in signal 27p and a corresponding n number of cycles at frequency $k_2$ for each binary 1 bit in signal 27p. The output of pulse generator 28 and, consequently, the transmitted sideband signal ($f_o+k_1$, $f_o+k_2$) will therefore have two characteristics.

The first characteristic (namely, the frequency of the reflected sideband signal) identifies the value of binary digit (i.e., a binary 1 or a binary 0). The second characteristic (namely the number of cycles at frequency $k_1$ and the number of cycles at frequency $k_2$) identifies the number of binary bits in the reflected signal and can be used to establish the beginning and end of each binary bit or digit in the reflected signal. Receiver 23 utilizes both of these characteristics to recover the coded signal in the manner described below.

Figure 10:
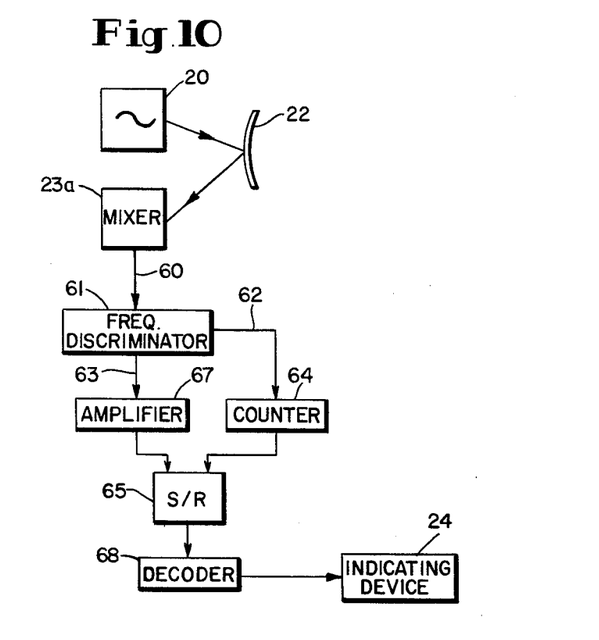
FIG. 10 shows a recording unit in greater detail.

Referring to FIG. 10, receiver 23 comprises a mixer 23a such that the frequency $k_1$ and, respectively, $k_2$ occur at different times at its output 60 and are emitted to a frequency discriminator 61, which can be of known type and has two outputs 62, 63, at the first one 62 of which a signal with the frequency $k_1$ and, respectively, $k_2$ occurs, and at the second one 63 a digital data signal occurs. The frequency discriminator 61 is capable of emitting as data signal a certain direct voltage when the frequency $k_1$ occurs at its input, and a different direct voltage when the frequency $k_2$ occurs at its input.

The signal at the first output 62 of the frequency discriminator is passed to a counter 64 or computer, which cyclically calculates or counts n entire cycles and calculates or counts the cycles n in number with a frequency of $k_1$ and, respectively, $k_2$. The counter 64 further is capable for every time when it has counted n entire cycles to control a shift register 65 or other memory of known type to step one memory position ahead.

The signal at the second output 63 of the frequency discriminator is passed via an amplifier 67 to the shift register 65 where said data signal is stored. Between the amplifier 66 and the counter 64 a synchronizing coupling 67 is located, through which the amplifier sends a signal to counter 64 to start counting when data enters into the amplifier. Data transferred from the recording transmitter are of binary kind, so that said data signal preferably consists of a pulse train of the two direct voltage, which thus alternate.

When, for example, a "0" is transferred from the recording transmitter, the frequency $k_1$, for example, occurs at the output of the receiver 23 and thereby at the first output 62 of the frequency discriminator 61. At the second output 63 of the frequency discriminator a direct voltage occurs, which after amplification is emitted to the shift register 65 and the counter 64 via the synchronizing coupling 67. The counter 64 starts counting n entire cycles of the frequency $k_1$ and thereafter controls the shift register 65 to step ahead one memory position. When, for example, five binary 0's are received without interruption therebetween, the direct voltage signal into the shift register is constant. The counter 64 will count five cycles of n entire cycles, and in the shift register five binary 0's are stored in five successive positions or bins. The course of events is entirely analogous when binary 1's are transferred, which gives then rise to the frequency $k_2$.

The said number n is equal to the division factor n of the frequency divider 29 stated above.

The synchronization of counter 64 by way of coupling 67 preferably takes place in such a manner, that the counter is set to zero and starts counting for every edge in the pulse train occurring at the second output 63 of the frequency discriminator 61.

It is, thus, clear that a certain information symbol is scanned by the duration of the received signal in dependence of its frequency.

The shift register thereafter is decoded by device 68, which decoded signal is transferred to the indication device 24 for a read-out or other use.

Figure 11:
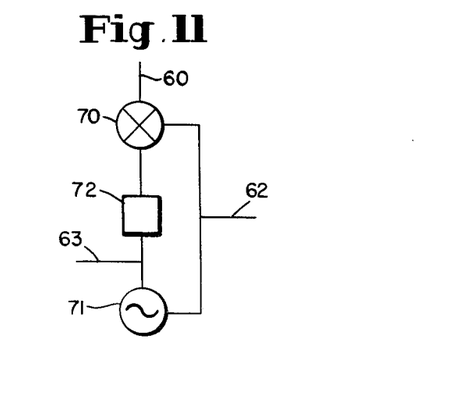
FIG. 11 shows a frequency discriminator.

The frequency discriminator 61 preferably is as shown in FIG. 11. It comprises a comparison circuit 70, a voltage-controlled oscillator 71 and an integrator 72. The output from the oscillator is coupled back to the comparison circuit 70. When the frequency $k_1$ and, respectively, $k_2$ lies within the operation range of the oscillator 71, the oscillator is adjusted to the received frequency in that the comparison circuit is capable of sending a signal corresponding to the difference frequency of the frequency of the received signal and the frequency of the oscillator when these do not agree. The frequency discriminator further is capable of supplying a signal to the integrator when the frequency of a received signal and the frequency of the oscillator agree, which signal is converted in the integrator to a data signal, which is a direct voltage.

The received frequencies $k_1$ and, respectively, $k_2$ are taken out at the oscillator 71. The generated direct voltages are taken out between the integrator 72, and the oscillator 71, where the integrator is an amplifying unit, which together with the oscillator 71 in known manner forms a lower direct voltage level for a lower frequency, for example $k_1$, and a higher direct voltage level for a higher frequency, for example $k_2$.

It will be appreciated that the frequency discriminator 61 may be of any suitable, conventional circuit design. For example, a National Semiconductor micropower phase-locked loop CD 4046 BM/CD 4046 BC may be used. Counter 64 is also a conventional design, one example being the National Semiconductor 4022. Shift register 65 may also be conventional circuit design such as the previously mentioned National Semiconductor 4031 register. Likewise, decoder 68 may also be a suitable, conventional design such as a binary-to-decimal converter circuit to provide a convenient decimal read-out at device 24.

From the foregoing description it is evident that receiver 23 is tuned to receive both of the reflected signal frequencies $f_o+k_1$ and $f_o+k_2$. In addition to receiving the reflected signal, it is understood that mixer 23a also receives a local oscillator signal to recover the modulating signal which contains the binary code in the form of frequencies $k_1$ and $k_2$. The recovered signal containing the frequencies $k_1$ and $k_2$ is fed from the output of mixer 23 to the input of frequency discriminator 61.

In response to frequency $k_1$, discriminator 61 produces at its digital output 63 a first d.c. voltage level (representing a binary 0 value), and in response to frequency $k_2$, discriminator 61 produces at output 63 a second d.c. voltage level (representing a binary 1 value). Thus, a digital data signal corresponding to the coded signal 27p will be produced at the discriminator's output 63 and will be conducted to the data input of shift register 65. Each time counter 64 counts n number of cycles of either frequency $k_1$ or frequency $k_2$, it supplies a shift command signal to shift register 65, causing it to shift one memory position. In this manner, the binary bits in the digital data signal will be properly loaded in shift register 65 to provide for the storage of the recovered code.

It will be appreciated that in place of output 62, the recovered modulating signal at output 60 could be fed directly to counter 64 with intervening amplification, if needed.

Figure 3:
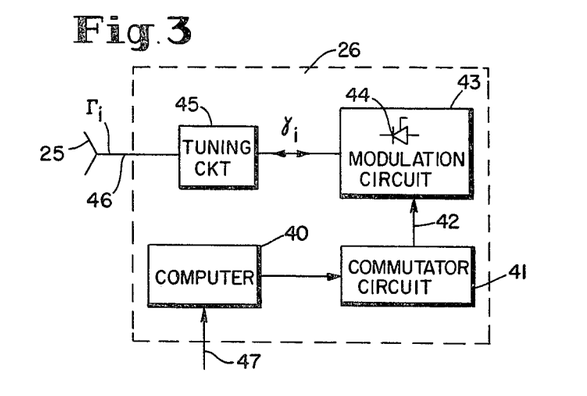
FIG. 3 is a block diagram for a portion of the recording transmitter.

The recording transmitter may optionally be equipped with the single diode frequency modulator of FIG. 3 in place of the dual diode modulator disclosed in U.S. Pat. No. 4,242,661. The single diode modulator shown in FIG. 3 comprises a computer 40, and a commutator circuit (i.e., a voltage staircase generator) 41. Computer 40 may be a frequency multiplier for controlling the commutator circuit 41. Circuit 41 is a known circuit design which is capable of emitting at its output 42 signals with different voltage levels in the form of a voltage staircase. The computer 40 controls the commutator circuit so that said circuit 41 in sequence emits said voltage levels, which are three or more in number. The output 42 of the commutator circuit 41 is coupled to a modulation circuit 43, which comprises a diode 44 for modulating a carrier wave, which is received by the aerial 25. At the application of the present invention the carrier wave is transmitted by the recording unit and reflected in the recording transmitter, which comprises said frequency modulator.

Between the aerial 25 and the modulation circuit 43 a tuning circuit 45 is provided.

The different voltage levels of the commutator circuit 41 are applied one after the other to the diode 44 in the modulation circuit, whereby the carrier wave received is reflected in the modulation circuit 43. Due to the difference in voltage levels applied to the diode, not only the phase position of the carrier wave received is rotated, but also an amplitude variation will occur. For a single sideband of the first order to be formed, the relation (1) below between occurring phase rotations and amplitudes for the different voltage levels must be satisfied $$\sum_{i=1}^{N} \frac{\gamma_i}{1 - S_{22}\gamma_i} \cdot e^{j\frac{2}{N}i} = 0 \text{ where } \gamma_i = \frac{V_i}{V_{in}} \quad (1)$$

where $\gamma_i$ are the different reflection coefficients of the diode, and N is the number of voltage levels with equal duration, and $S_{22}$ is a non-dimensional factor according to below.

$\gamma_i$ is defined as $\gamma_i=(V_i/V_{in})$ where $V_i$ is the voltage actually reflected by the diode, and $V_{in}$ is the signal voltage ingoing to the diode.

A tuning circuit 45 is arranged to influence phase rotations and amplitude variations occurring in the modulation circuit 43 so that a single sideband is formed on the output 46 of the tuning circuit 45 to the aerial 25. The tuning circuit is a non-dissipative and reciprocal matching net.

The single sideband modulator 26, thus, is operated digital by the computer 40. The computer 40 is capable to control the commutator circuit so that said circuit successively applies different voltage levels, which are N in number and where an entire sequence of levels have a cycle time T. The carrier wave, which has the frequency $f_o$, is reflected in the diode, and the reflected wave consists of frequency components $f_o+n\cdot(1/T)$ where $n=0, \pm 1, \pm 2, \ldots$. By a suitably selected tuning circuit a sideband band $n_o$ with the amplitude 0 and a symmetrically located sideband $-n_o$ with an amplitude separate from 0 are obtained. A preferred case is $n_o = -1$, to which the above relation (1) applies.

According to a preferred embodiment, the number of voltage levels is low, but also a great number of voltage levels can be used. The minimum number N of voltage levels $V_i$ is 3. It further is preferred to choose for every voltage level $V_i$ equal duration, i.e. T/N.

The said reflection coefficient $\gamma_i$ refers to the reflection coefficient prevailing between the diode 44 and the tuning circuit $\Gamma_i$ designates the reflection coefficient prevailing at the output of the tuning circuit to the aerial 25.

The non-dimensional factor $S_{22}$ expresses the load, which the diode sees of tuning net and aerial for a single sideband to be formed.

Figure 4:
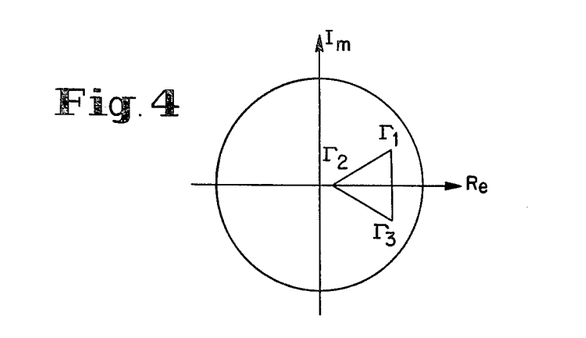
FIG. 4 is a reflection diagram for a diode in the recording transmitter.

It is possible to draft $\Gamma_i = A \cdot e^{j\phi}$ where A is the amplitude and $\phi$ is the phase angle. For a case where N=3, it will appear from above relation and known relation between $\gamma_i$ and $\Gamma_i$ that the three reflection coefficients $\Gamma_i, \Gamma_2, \Gamma_3$ must define the corners in an equilateral triangle for a single sideband to be formed. FIG. 4 shows by way of example a reflection diagram in the plane of complex numbers where an equilateral triangle is formed. In FIG. 4 Im designates an imaginary axis and Re a real axis.

Knowing the reflection coefficients of the diode 44, and therewith the factor $S_{22}$, it is, thus, possible to calculate a tuning circuit 45 in known manner from the factor $S_{22}$, which is of such a nature that the reflection characteristics of the diode are so influenced that the reflection characteristics at the aerial 25, i.e. $\Gamma_i$ forms the corners in an equilateral triangle.

Below three examples are given where voltage levels $V_i$ are indicated in sequences being repeated.

At each example, further, said non-dimensional factor $S_{22}$ is indicated explicitly removed from said relation (1) above in order that a single sideband is to be formed.

EXAMPLE I

| Voltage Level (V) | Time Interval (t) |
|---|---|
| $V_1$ | $0 < t < T/3$ |
| $V_2$ | $T/3 < t < 2T/3$ |
| $V_3$ | $2T < t < T$ |

$N = 3$ yields from the above relation (1)

$$S_{22} = (\gamma_1 + \gamma_2 e^{j2\pi/3} + \gamma_3 e^{j4\pi/3}) / \left[ \gamma_1 \cdot \gamma_3 \left(1 + \frac{e^{j4\pi}}{3}\right) + \gamma_1 \cdot \gamma_2 \left(1 + \frac{e^{j2\pi}}{3}\right) + \gamma_2\gamma_3 (e^{j2\pi/3} + e^{j4\pi/3}) \right]$$

EXAMPLE II

| Voltage Level (V) | Time Interval (t) |
|---|---|
| $V_1$ | $0 < t < T/4$ |
| $V_2$ | $T/4 < t < T/2$ |
| $V_3 = V_2$ | $T/2 < t < 3T/4$ |
| $V_4$ | $3T/4 < t < T$ |

$N = 4$ and the above relation (1) yield $$S_{22} = \frac{\gamma_1 + \gamma_2(j - 1) - j\gamma_4}{(1 - j)\gamma_1\gamma_4 + j\gamma_1\gamma_2 - \gamma_4\gamma_2}$$

This relation (3) yields that $\gamma_i$ in a reflection diagram in the plane of complex numbers must define a rectangular and isosceles triangle.

EXAMPLE III

| Voltage Level (V) | Time Interval (t) |
|---|---|
| $V_1$ | $0 < t < T/4$ |
| $V_2$ | $T/4 < t < T/2$ |
| $V_3$ | $T/2 < t < 3T/4$ |
| $V_4$ | $3T/4 < t < T$ |

$N = 4$ and the above relation (1) yield $$S_{22} = \frac{b}{2a} \pm \sqrt{\frac{b^2 - 4ac}{4a^2}} \text{ where}$$

$a = (\gamma_1 - \gamma_3) \gamma_2\gamma_4 + j (\gamma_2 - \gamma_4) \gamma_1\gamma_3$
$b = (\gamma_1 - \gamma_3) (\gamma_2 + \gamma_4) + j(\gamma_2 - \gamma_4) (\gamma_1 + \gamma_3)$
$c = (\gamma_1 - \gamma_3) + j(\gamma_2 - \gamma_4)$ This relation (4) yields that $\Gamma_i$ in a reflection diagram in the plane of complex numbers shall define the end points on two straight lines, which interest one another at a right angle and have equal length.

A carrier wave incoming to the aerial can be drafted $A_o \cos(\omega_o t)$. After the reflection in the diode with associated tuning circuit both the amplitude and the phase position have been changed at every applied voltage level. The reflected wave, therefore, can be drafted $A_i \cos(\omega_o t + \psi_i)$.

Figure 5:
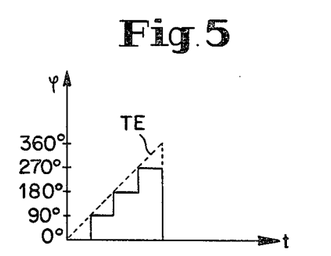
FIGS. 5 and 6 are diagrams showing the mode of operation of said known modulator.
Figure 6:
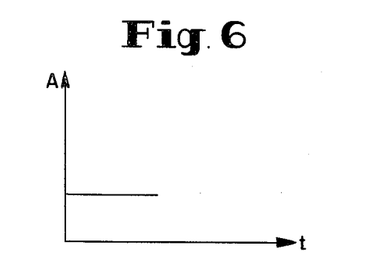

In FIGS. 5 and 6 the phase shifting of the carrier wave effected according to the Swedish Laid Out Document 7503620-2 is illustrated while the amplitude is maintained constant for generating a single sideband. In FIG. 5 TE designates the envelope to the fully drawn staircase curve.

Figure 7:
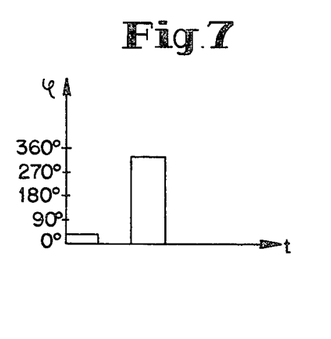
FIGS. 7 and 8 are diagrams showing the mode of operation of a modulator according to the present invention.
Figure 8:
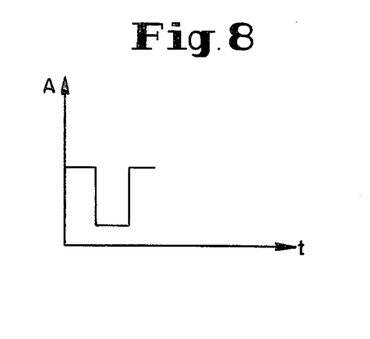

In FIGS. 6 and 7 the phase rotations and amplitude variations are illustrated by way of example which are the result of applying to the diode 44 three different voltage levels $V_1$, $V_2$ and $V_3$, i.e. according to the Example I above.

It is evident, thus, that it is possible by only one dissipative diode and one tuning circuit to generate a single sideband.

A further advantage of the modulator 26 is the possibility of obtaining an ideal modulator function even when the diode has relatively large losses, i.e. when the so-called dynamic Q-value is low.

According to a preferred embodiment, the diode is a varactor diode.

The Q-value is given for a given maximum interval in the voltage level, and one can choose between different intermediate voltages, depending on the desired efficiency degree.

Example III yields the highest efficiency degree, but on the other hand requires four different voltage levels.

Example II has the same sequence as Example III, but only three voltage levels are required. This embodiment, therefore, is preferred when a low number of voltage levels is essential. Example II yields a lower efficiency degree than Example III. Example I yields a higher efficiency degree than Example II when the Q-value $\gtrsim 8$.

As mentioned above, pulse generator 28 generates two frequencies $k_1$ and $k_2$, respectively. When the modulator of FIG. 3 is used, the output of pulse generator 28 is connected to the input 47 of the computer 40 (i.e., the frequency multiplier), which multiplies the signal frequencies $k_1$ and $k_2$ by the integer N, where N is the number of different voltage levels in the staircase which is applied to diode 44 by commutator circuit 41. Thus, the pulse signal which is emitted to commutator circuit 41 by the computer or frequency multiplier 40 will have a frequency $N \cdot k_1$ when frequency $k_1$ is present at input 47 and will further have a frequency $N \cdot k_2$ when frequency $k_2$ is present at input 47. The pulse signal supplied to commutator circuit 41 by the computer or frequency multiplier 40 clocks circuit 41 so that the rate at which the different voltage levels are applied by circuit 41 to diode 44 corresponds to the frequency ($N \cdot k_1$ or $N \cdot k_2$) of the pulse signal from computer 40. When three voltage levels are used for example, then they will be applied to diode 44 in the time period $1/k_1$ when frequency $k_1$ is present at input 47, and they will likewise be applied to diode 44 in the time period $1/k_2$ when frequency $k_2$ is present at input 47. It will be appreciated that computer 40 may be eliminated by supplying to the modulator input 47 frequencies $N \cdot k_1$ and $N \cdot k_2$ in place of frequencies $k_1$ and $k_2$, respectively. Thus, commutator circuit 41 applies the different staircase voltage levels to diode 44 in a beat proportional to the frequency $k_1$ and $k_2$, respectively. This results in the formation of the sidebands $f_o + k_1$ and $f_o + k_2$, respectively, at the output 46 of the tuning circuit 45. The operation of pulse generator 28 is controlled by the code transmitter 27 as previously explained. The code transmitter 27 and pulse generator 28 are arranged so that pulse generator 28 generates the frequency $k_1$ when the code transmitter emits one of the two binary digits 0 or 1, and generates the frequency $k_2$ when the code transmitter 27 emits the other binary digit. Hereby a single sideband with the frequency $f_o + k_1$ will be transmitted during the duration of one binary digit, and with the frequency $f_o + k_2$ during the duration of the other binary digit. When the coding device does not send pulses to the pulse generator 28, the generator does not generate any signal.

It is clearly apparent that the safety or reliability in the information transfer in this way is increased substantially, because firstly two alternately occurring frequencies different from the interrogating frequency are retransmitted by the recording unit, and secondly the receiver has the possibility to decide in a simple way whether one or more equal binary digits were sent after each other.

The recording transmitter according to the present invention can optionally be equipped with devices for remote programming the transmitter as disclosed in the commonly owned application Ser. No. 191,501.

The recording transmitter then is capable to open its memory for feeding information into the memory or out therefrom only when a key code, in the form of a pulse train at the beginning of the pulse train received from the recording unit, agrees with a code stored in a key device. The key code received, thus, is compared with the stored key code, and the memory of the recording transmitter is opened only when there is agreement therebetween.

Figure 9:
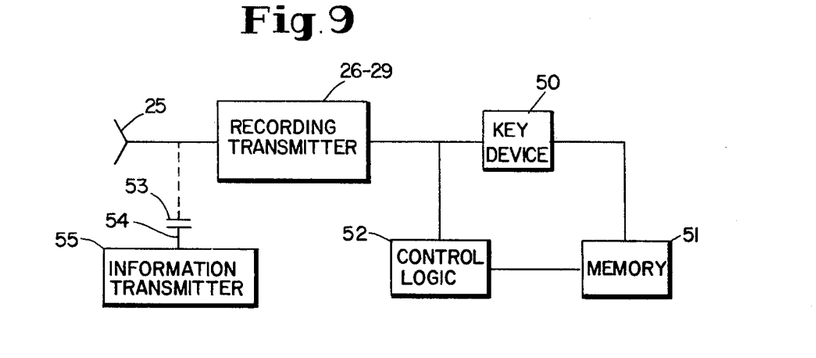
FIG. 9 shows in schematic way a device for remote programming coupled to a recording transmitter.

In FIG. 9 a block diagram is shown schematically which is intended for a device capable to remote program a recording transmitter 26–29 of the aforesaid kind. It is to be understood that this equipment is optionable and is not required for operation of the invention claimed and disclosed herein. According to FIG. 9, a key device 50, an electric memory 51 and, respectively, a control logic 52 for feeding in data into the memory and out therefrom correspond to the key device 72, the memory 75 and, respectively, the means 82 disclosed in application Ser. No. 191,151.

The remote programming device 50–52 preferably is connected to the coding device 27. The device 50–52 preferably is designed so that a new key can be fed into the key device 50. The key device can comprise an electronic memory or make use of a portion of the memory 51. When the key device includes a memory, voltage must all the time be on necessary portions of the memory. The feed into the memory 51 and out therefrom takes place in the way described in Ser. No. 191,151. In the event that the key is to be changed, a message is sent, the first portion of which contains the key to be changed. Due to the key device 50 information then can be fed into the memory 51 and out therefrom by means of the control logic 52. After the key follows an instruction to the control logic 52 to erase the key to be changed, whereafter the new key follows together with an instruction to the control logic 52 to feed the new key into the key device 50. This embodiment is especially advantageous when a recording transmitter for different reasons must be provided with a new identification code, as for example at re-destination of railway cars or, for example, at changes of traffic roads, etc.

The apparatus shown in FIG. 9 further can be provided with a capacitive aerial 53 for receiving a signal sent entirely adjacent the recording transmitter by means of a sender aerial 54 completing a capacitive transfer link. To said sender aerial 54 an information transmitter 55 is connected which generates signals of the same nature as the recording unit. The signals fed into the recording transmitter via the aerial 53 are processed in the way described above when signals from the recording unit are received via the aerial 25. The advantage of this system is that at the recording transmitter thus can be provided with new information without having access to a recording unit. As mentioned above, voltage must all the time be applied to the entire memory 51 or portions thereof and possibly to the memory in the key device 50. According to a modified embodiment, the control logic 52 is capable at the reception of a signal to connect full voltage to all components comprised in the recording transmitter, and when no signal is received or sent, to apply voltage only to components requiring to permanently be live.

It is apparent, thus, that the present invention substantially increases the safety or reliability in the information transfer at the information transfer systems here concerned, that the modulation of frequency of the signals takes place by simpler and cheaper devices than previously, and that the possibility of changing the systems by the introduction of new key codes increases the flexibility of the system.

The present invention must not be regarded restricted to the embodiments described above, but can be varied within the scope of the attached claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A radio communication apparatus for a system having at least first and second stations in which one of said first and second stations is movable relative to the other of said first and second stations, said radio communication apparatus comprising a recording unit located at said first station and having means for transmitting a first signal (22a), a transceiver located at said second station for receiving said first signal, said transceiver comprising (a) a signal producing means (27, 28) for supplying a modulating signal containing information including a code individual to said transceiver, (b) a frequency converter (26) comprising a modulator connected to said signal producing means for modulating said first signal with said modulating signal by frequency shifting said first signal in such a manner that a second signal (25a) is produced in the form of a sideband, and (c) means (25) connected to said frequency converter to provide for the transmission of said second signal, said signal producing means comprising (a) a coding device (27) for supplying said information in the form of a coded pulse signal which defines the bits of a binary word, (b) a pulse generator (28) connected to the output of said coding device for developing said modulating signal from said coded pulse signal, and (c) a frequecy divider (29), said generator being controlled by the binary logic states in said coded pulse signal to provide said modulating signal with a first pre-selected frequency ($k_1$) as long as said pulse signal is at one binary logic state and further to provide said modulating signal with a second pre-selected frequency ($k_2$) as long as said pulse signal is at the other binary logic state, said first and second frequencies being different from each other, said frequency divider being connected to the output of said pulse generator for frequency dividing each frequency of said modulating signal by a single predetermined value (n) to provide an output signal having (a) a third pre-selected frequency ($k_1/n$) when the frequency of said modulating signal is said first frequency and (b) a fourth pre-selected frequency ($k_2/n$) when the frequency of said modulating signal is said second frequency, said coding device being controlled by the third and fourth frequencies of said output signal such that (a) each of the bits having one binary logic state in said coded signal is provided with a first preselected length related to said third frequency and (b) each of the bits having the other of the binary logic states in said coded pulse signal is provided with a second preselected length related to said fourth frequency, and said generator being responsive to said pulse signal to provide said modulating signal with a pre-selected number of cycles for each bit having said one logic state and to further provide said modulating signal with a pre-selected number of cycles for each bit having said other logic state, said modulator being responsive to said modulating signal (a) to provide said second signal with a first sideband frequency $(f_o+k_1)$ as long as the frequency of said modulating signal is said first frequency and (b) to further provide said second signal with a second sideband frequency $(f_o+k_2)$ as long as the frequency of said modulating signal is said second frequency, and said recording unit further comprising a receiver, said receiver having first means for receiving said second signal and for recovering said modulating signal, and second means connected to said first means for recovering said information from the recovered modulating signal.

2. The radio communication apparatus defined in claim 1 wherein said first means includes frequency discriminator means responsive to said first and second frequencies in the recovered modulating signal for producing a binary coded digital signal which corresponds to said coded pulse signal, a shift register, said frequency discriminator means being connected to said shift register for feeding said digital signal to said shift register to provide for the entry of the binary bits represented by said digital signal into said register, and further means connected to said first means and to said shift register for counting the number of cycles of the first and second frequencies in the recovered modulating signal and for shifting said shift register one stage each time a pre-selected number of cycles of the recovered modulating signal is counted.

3. The radio communication apparatus defined in claim 2 wherein said signal producing means produces said modulating signal in such a manner that each of the binary 1 and binary 0 bits in said coded pulse signal is represented by a common number of cycles in the modulating signal, and wherein said further means shifts said register by one stage each time it counts said common number of cycles.

4. A radio communication apparatus for a system having at least first and second stations in which one of said stations is movable relative to the other of said stations, means located at said first station for transmitting a first signal, a transceiver located at said second station for receiving said first signal and comprising (a) first means for supplying information in the form of a coded digital signal which defines the bits of a plural bit binary word and (b) second means electrically connected to said first means for producing a pulse signal having (i) a pre-selected number of cycles at a first pre-selected frequency for each binary 1 bit in said digital signal and (ii) a pre-selected number of cycles at a second pre-selected frequency for each binary 0 bit in said digital signal, said second frequency being different from said first frequency, said transceiver further comprising means electrically connected to said second means for modulating said first signal with said pulse signal to produce a modulated signal, and means electrically connected to said modulating means for transmitting said modulated signal, there being a unit located at said first station and including first means for receiving said modulated signal and for recovering said pulse signal from the received modulated signal, and further means electrically connected to said first means of said unit, said further means being responsive to the frequencies in the recovered pulse signal and also to the number of cycles of said first and second frequencies in the recovered pulse signal for producing a data signal containing said information.

5. A radio communication apparatus located at a first station to provide radio communication with a second station wherein said one of said first and second stations is movable relative to the other of said first and second stations, and wherein said second station is equipped to receive and recover information from a first signal, said radio communication apparatus comprising: first means for supplying said information in the form of a coded digital signal which defines the bits of a plural bit binary word, second means electrically connected to said first means for producing a pulse signal having (a) a pre-selected number of cycles at a first pre-selected frequency for each binary 1 bit in said digital signal and (b) a pre-selected number of cycles at a second pre-selected frequency for each binary 0 bit in said digital signal, said second frequency being different from said first frequency, means electrically connected to said second means for modulating a radio signal with said pulse signal to produce said first signal and means electrically connected to said modulating means for transmitting said first signal for reception by said second station.

6. A radio communication apparatus located at a first station in a radio communication system in which a second station is equipped to transmit a frequency modulated, electromagnetic signal, in which one of said first and second stations is movable relative to the other, and in which said electromagnetic signal is modulated at said second station by a binary coded information signal to provide said electromagnetic signal with (i) a first frequency representing each binary 1 in said information signal, (ii) a second frequency representing each binary 0 in said information signal and (iii) a common pre-selected number of cycles representing each binary digit in said information signal, said radio communication apparatus comprising first means for receiving said electromagnetic signal, second means electrically connected to said first means and responsive to said first and second frequencies in the received signal for producing a binary coded digital signal which contains the information in said information signal, a shift register, said second means being electrically connected to said shift register for feeding said digital signal to said shift register to provide for the entry of binary bits represented by said digital signal into said register, and further means connected to said first means and to said shift register for counting the number of cycles of the first and second frequencies in the received signal and for shifting said shift register one stage each time said common pre-selected number of cycles is counted.

* * * * *